United States Patent
Knapp (12)

(10) Patent No.: US 8,834,761 B2
(45) Date of Patent: Sep. 16, 2014

(54) PERMANENTLY LUBRICATED FILM GASKET AND METHOD OF MANUFACTURE

(75) Inventor: Mark Knapp, Ravenna, OH (US)

(73) Assignee: SpringSeal, Inc., Streetsboro, OH (US)

( * ) Notice: Subject to any disclaimer, the term of this patent is extended or adjusted under 35 U.S.C. 154(b) by 761 days.

(21) Appl. No.: 12/274,614

(22) Filed: Nov. 20, 2008

(65) Prior Publication Data

US 2009/0065968 A1   Mar. 12, 2009

Related U.S. Application Data

(60) Division of application No. 11/411,551, filed on Apr. 26, 2006, now Pat. No. 7,469,905, which is a continuation-in-part of application No. 10/419,541, filed on Apr. 21, 2003, now abandoned, which is a continuation-in-part of application No. 09/998,697, filed on Nov. 30, 2001, now Pat. No. 6,550,775, which is a continuation-in-part of application No. 09/726,814, filed on Nov. 30, 2000, now Pat. No. 6,367,802.

(51) Int. Cl.
| | |
|---|---|
| B29C 47/06 | (2006.01) |
| F16L 25/00 | (2006.01) |
| F16L 17/025 | (2006.01) |
| F16L 21/035 | (2006.01) |
| F16J 15/02 | (2006.01) |

(52) U.S. Cl.
CPC ........... *F16L 17/025* (2013.01); *F16L 25/0036* (2013.01); *Y10S 285/903* (2013.01); *F16L 21/035* (2013.01); *F16J 15/027* (2013.01); *F16L 25/0054* (2013.01)

USPC ............. 264/171.1; 264/171.26; 264/171.27; 264/241; 285/903

(58) Field of Classification Search
USPC ............... 264/171.26, 171.27, 241, 248, 249, 264/280, 171.1; 427/421.1
See application file for complete search history.

(56) References Cited

U.S. PATENT DOCUMENTS

| 2,230,725 A | 2/1941 | Nathan |
|---|---|---|
| 2,259,940 A | 10/1941 | Nathan |

(Continued)

FOREIGN PATENT DOCUMENTS

| DE | 3826622 | 2/1990 |
|---|---|---|
| DE | 3909381 | 12/1990 |

(Continued)

OTHER PUBLICATIONS

International Search Report dated Sep. 24, 2009; 25 pages.

(Continued)

*Primary Examiner* — Monica Huson
(74) *Attorney, Agent, or Firm* — Tarolli, Sundheim, Covell & Tummino LLP

(57) ABSTRACT

A permanently lubricated film gasket for providing a fluid-tight seal between a corrugated pipe and a smooth annular section of an outer pipe or section when the corrugated pipe and the outer pipe or section are in a relative surrounded and surrounding relationship. A first portion of the gasket is shaped to fit within a groove or recess of the corrugated pipe. A second portion of the gasket extends from the first portion. The second portion is at least partially comprised of permanently lubricated film for facilitating in the connection of the pipes along a single direction.

17 Claims, 4 Drawing Sheets

(56) References Cited

U.S. PATENT DOCUMENTS

| | | | |
|---|---|---|---|
| 2,578,933 A | 12/1951 | Hunter et al. | |
| 2,953,398 A | 9/1960 | Haugen et al. | |
| 3,031,200 A | 4/1962 | Hamer | |
| 3,118,682 A | 1/1964 | Fredd | |
| 3,380,763 A | 4/1968 | Schmunk | |
| 3,386,745 A | 6/1968 | Hein | |
| 3,445,120 A | 5/1969 | Barr | |
| 3,469,854 A | 9/1969 | Linwood | |
| 3,695,639 A | 10/1972 | Shire et al. | |
| 3,796,447 A | 3/1974 | de Putter | |
| 3,813,107 A | 5/1974 | Ditcher | |
| 3,856,315 A | 12/1974 | Stansbury | |
| 3,865,386 A | 2/1975 | Wilke | |
| 3,955,834 A | 5/1976 | Ahlrot | |
| 4,018,461 A | 4/1977 | Bram | |
| 4,097,074 A | 6/1978 | Nagao et al. | |
| 4,140,742 A * | 2/1979 | Fischer | 264/268 |
| 4,188,040 A | 2/1980 | Wolf et al. | |
| 4,223,895 A | 9/1980 | Roberts, Jr. et al. | |
| 4,298,206 A | 11/1981 | Kojima | |
| 4,333,662 A | 6/1982 | Jones | |
| 4,365,818 A | 12/1982 | Tolliver | |
| 4,387,900 A | 6/1983 | Ditcher et al. | |
| 4,394,024 A | 7/1983 | Delhaes | |
| 4,395,159 A | 7/1983 | Karuks et al. | |
| 4,487,421 A | 12/1984 | Housas et al. | |
| 4,552,914 A * | 11/1985 | Sterling | 524/269 |
| 4,566,704 A | 1/1986 | van Dongeren | |
| 4,575,128 A | 3/1986 | Sundquist | |
| 4,585,026 A | 4/1986 | Norton | |
| 4,602,792 A | 7/1986 | Andrick | |
| 4,602,793 A | 7/1986 | Andrick | |
| 4,630,848 A | 12/1986 | Twist et al. | |
| 4,641,858 A | 2/1987 | Roux | |
| 4,642,269 A | 2/1987 | Kohyama et al. | |
| 4,702,502 A | 10/1987 | Shade et al. | |
| 4,711,474 A | 12/1987 | Patrick | |
| 4,743,422 A | 5/1988 | Kalriis-Nielsen et al. | |
| 4,772,154 A | 9/1988 | Caroulle | |
| 4,795,166 A | 1/1989 | Irmler | |
| 4,818,209 A | 4/1989 | Petersson et al. | |
| 4,826,028 A | 5/1989 | Vassallo et al. | |
| 4,834,398 A | 5/1989 | Guzowski et al. | |
| 4,969,653 A | 11/1990 | Breen | |
| 5,013,052 A | 5/1991 | Butler et al. | |
| 5,045,635 A | 9/1991 | Kaplo et al. | |
| 5,058,907 A | 10/1991 | Percebois et al. | |
| 5,064,207 A | 11/1991 | Bengtsson | |
| 5,067,751 A | 11/1991 | Walworth et al. | |
| 5,106,129 A | 4/1992 | Camacho et al. | |
| 5,114,162 A | 5/1992 | Ditcher | |
| 5,143,381 A | 9/1992 | Temple | |
| 5,169,161 A * | 12/1992 | Jones | 277/615 |
| 5,180,196 A | 1/1993 | Skinner | |
| 5,288,087 A | 2/1994 | Bertoldo | |
| 5,324,083 A | 6/1994 | Vogelsang | |
| 5,326,138 A | 7/1994 | Claes et al. | |
| 5,346,662 A | 9/1994 | Black et al. | |
| 5,360,851 A | 11/1994 | Feder et al. | |
| 5,407,236 A | 4/1995 | Schwarz et al. | |
| 5,415,436 A | 5/1995 | Claes et al. | |
| 5,542,717 A | 8/1996 | Rea et al. | |
| 5,573,279 A | 11/1996 | Rea et al. | |
| 5,577,741 A | 11/1996 | Sink | |
| 5,603,532 A | 2/1997 | Guest | |
| 5,626,349 A | 5/1997 | Sutherland et al. | |
| 5,679,303 A * | 10/1997 | Hayashi et al. | 264/167 |
| 5,687,976 A | 11/1997 | Andrick et al. | |
| 5,733,491 A * | 3/1998 | Grosset et al. | 264/172.1 |
| 5,735,528 A | 4/1998 | Olsson | |
| 5,806,593 A | 9/1998 | Surles | |
| 5,813,705 A | 9/1998 | Dole | |
| 5,973,061 A | 10/1999 | Feder et al. | |
| 5,988,695 A | 11/1999 | Corbett, Jr. | |
| 5,992,469 A | 11/1999 | Hegler | |
| 5,996,635 A | 12/1999 | Hegler | |
| 6,082,741 A | 7/2000 | Gregoire et al. | |
| 6,126,173 A | 10/2000 | Westhoff et al. | |
| 6,126,209 A | 10/2000 | Goddard | |
| 6,170,883 B1 | 1/2001 | Mattsson et al. | |
| 6,193,285 B1 | 2/2001 | Proctor | |
| 6,237,966 B1 | 5/2001 | Kearns | |
| 6,328,309 B1 * | 12/2001 | Corbett, Jr. | 277/314 |
| 6,343,623 B2 | 2/2002 | Hegler | |
| 6,359,073 B1 | 3/2002 | Babb et al. | |
| 6,367,802 B1 | 4/2002 | Knapp | |
| 6,458,301 B1 * | 10/2002 | Hendrix | 264/172.1 |
| 6,476,141 B1 | 11/2002 | Chang et al. | |
| 6,550,775 B2 | 4/2003 | Knapp | |
| 6,620,369 B1 | 9/2003 | Mead | |
| 6,726,219 B2 | 4/2004 | Bivens | |
| 6,739,632 B1 | 5/2004 | Thomas et al. | |
| 2004/0041347 A1 * | 3/2004 | Beach et al. | 277/314 |
| 2004/0072949 A1 | 4/2004 | Ding et al. | |
| 2006/0279084 A1 | 12/2006 | Collins | |
| 2007/0290455 A1 | 12/2007 | Knapp et al. | |

FOREIGN PATENT DOCUMENTS

| | | |
|---|---|---|
| DE | 19628639 | 1/1998 |
| EP | 0311296 | 4/1989 |
| GB | 2331137 | 5/1999 |

OTHER PUBLICATIONS

Notification of Transmittal of International Preliminary Report on Patentability and Citations and Explanations (7 pages) for International Application No. PCT/US06/017512, mailing date Jan. 27, 2011.

* cited by examiner

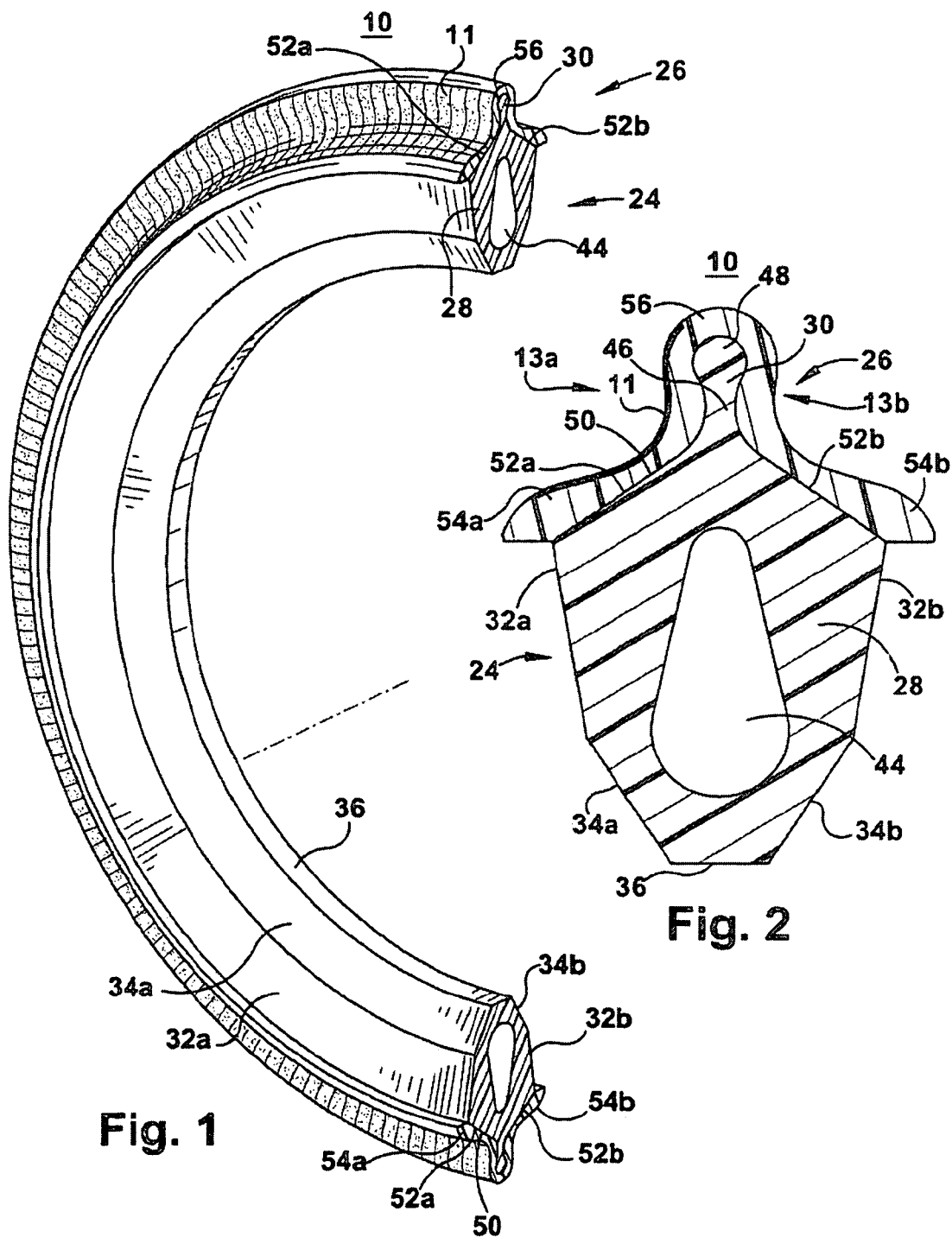

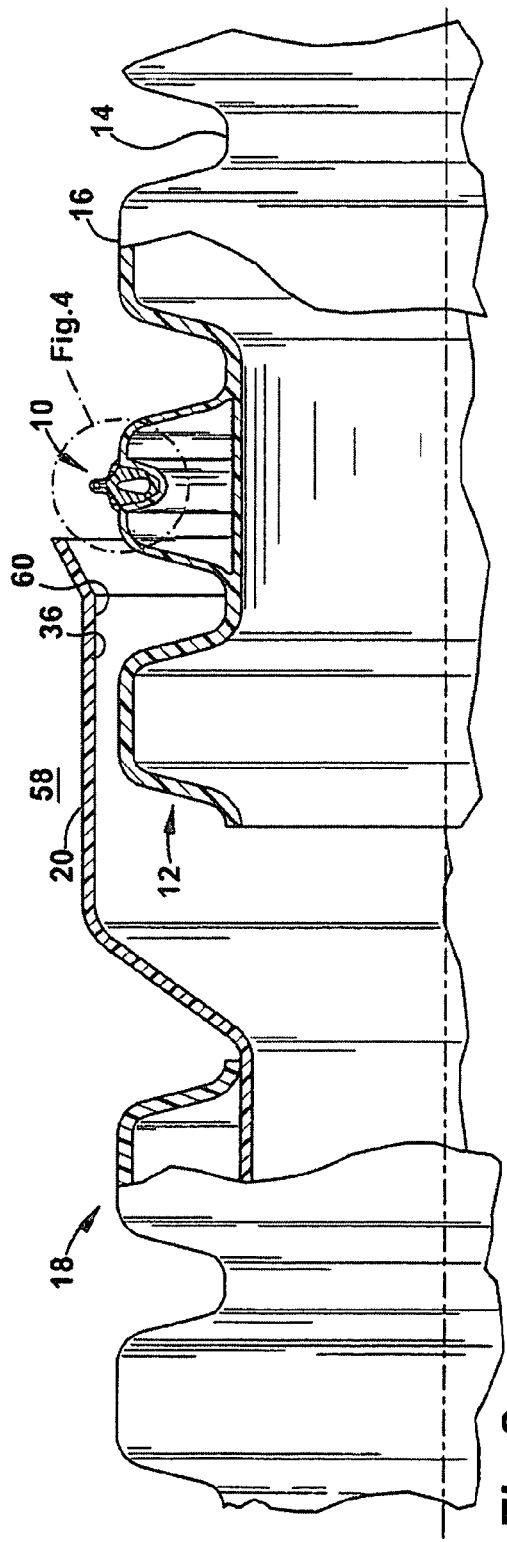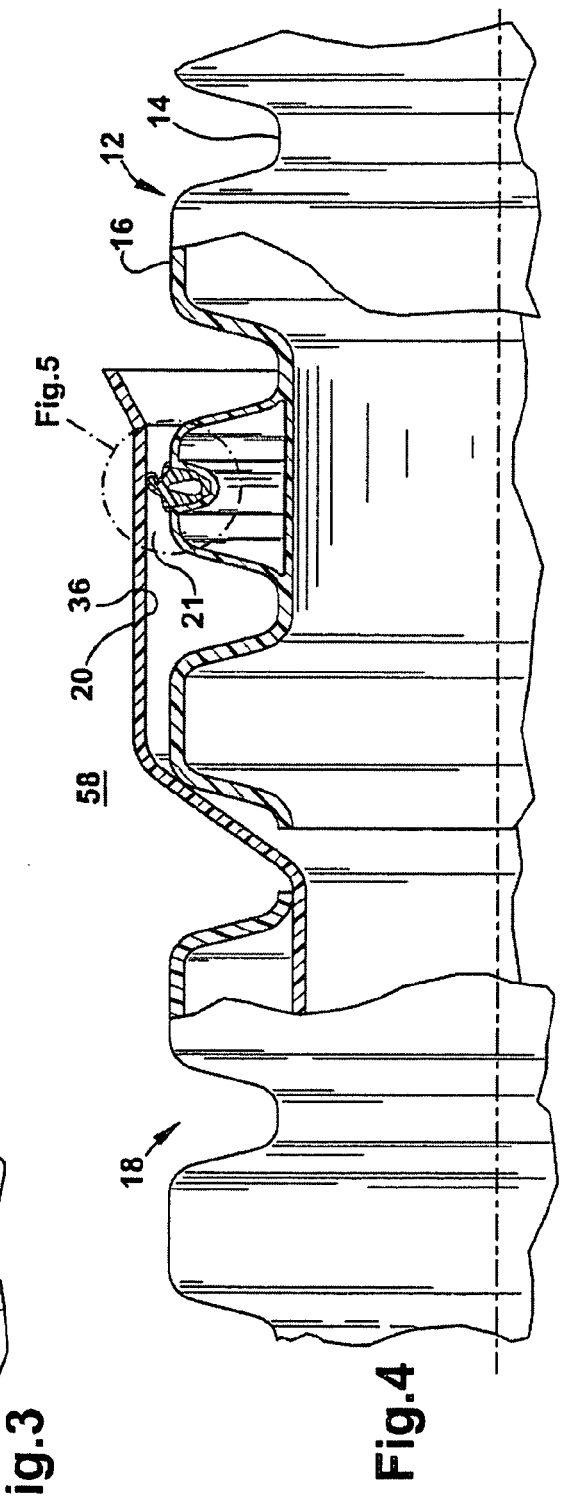

PERMANENTLY LUBRICATED FILM GASKET AND METHOD OF MANUFACTURE

CROSS-REFERENCES TO RELATED APPLICATIONS

The present application is a divisional application of co-pending application Ser. No. 11/411,551 filed on Apr. 26, 2006, entitled PERMANENTLY LUBRICATED FILM GASKET AND METHOD OF MANUFACTURE, which is a continuation-in-part application containing common subject matter as previously filed and co-pending application Ser. No. 10/419,541, filed in the U.S. Patent and Trademark Office on Apr. 21, 2003, entitled "PERMANENTLY LUBRICATED GASKET", which is a continuation-in-part of U.S. application Ser. No. 09/998,697, filed in the U.S. Patent and Trademark Office on Nov. 30, 2001, to issue as U.S. Pat. No. 6,550,775, entitled "ANNULAR GASKET," which is a continuation-in-part of U.S. patent application Ser. No. 09/726,814 filed in the U.S. Patent and Trademark Office on Nov. 30, 2000, entitled "ANNULAR GASKET WITH LOCKING STRUCTURE," now U.S. Pat. No. 6,367,802. The present application claims priority the aforementioned patents and patent applications, which are incorporated in their entirety herein by reference for all purposes.

TECHNICAL FIELD

The present invention relates to elastomeric gaskets for providing a seal between a pair of tubular members and, more specifically, to a gasket having at least a portion being made from thermoplastic embedded with a lubricating chemical film that permanently imparts properties of a lubricant from the gasket to the contacting surface of one of the tubular members.

BACKGROUND ART

It is well known to form a seal between two pipe sections, such as two corrugated pipe sections, where the end of one of the pipe sections has annular grooves and one of the pipe sections has an enlarged bell portion at one end. Some prior art elastomeric gaskets are placed around the end of the pipe section having annular grooves. The pipe section having annular grooves is inserted into an enlarged bell portion of a second pipe section. The elastomeric gasket contacts each of the pipe sections to form a seal between the pipe sections.

Typically, a large frictional force is encountered when the inner pipe and the elastomeric gasket is inserted into the outer pipe. As one end of the inner pipe is pushed into the enlarged end or bell of the outer pipe section or pipe connector, the gasket is sometimes pulled from the groove by the large frictional force. When the pipe is not properly sealed, ground water may leak into the pipe or fluid may leak out of the pipe and contaminate the ground.

Lubricant has been manually applied to elastomeric gaskets before the inner pipe and the gasket is inserted into the outer pipe. The lubricant reduces the frictional force between the gasket and the outer pipe. The reduced frictional force reduces the likelihood that the gasket will be pulled from the groove by the frictional force. The manual application of the lubricant is labor intensive and is usually performed in a trench or ditch making the lubricant susceptible to being removed by water frequently found in such environments. In addition, the manually applied lubricant is wiped from the gasket if the pipe joint is disassembled. As a result, the lubricant must be reapplied before the pipe joint is reassembled.

Costly secondary operations have also been developed for applying anti-frictional coatings to gasket surfaces. A secondary operation occurs when the lubricant is applied to the gasket after the gasket is cured. An example applying a lubricant in a secondary operation appears in U.S. Pat. No. 6,328,309 to Corbett. In particular, Corbett depicts a spray-on lubricant that is applied after the gasket is hardened. Secondary operations as taught in Corbett typically require additional steps such as heat treatment and/or prescribed cooling periods before the product is finished. In addition, the spray operations lack the ability to control the thickness of the lubricant coatings and the coatings often crack inhibiting the gaskets ability to stretch or compress without resulting in seal failure.

Prior art methods have been developed that self lubricate gaskets as they are assembled. For example, U.S. Pat. No. 4,365,818 to Tolliver discloses a seal including a cavity containing a lubricant, which is released when one pipe joint is slid over the seal. U.S. Pat. No. 5,143,381 to Temple is directed to a seal, which has an internal chamber containing a lubricant. A slit in the body of the seal extends into the chamber. When one pipe is moved over another pipe end, the slit is spread, thereby releasing the lubricant against the sealing surface. U.S. Pat. No. 5,626,349 to Sutherland et al. concerns a sealing ring containing a lubricant enclosed within a membrane formed on the ring's body. When a connecting pipe is slid into the pipe joint, the membrane is ruptured, releasing the lubricant and reducing the frictional forces imparted on the sealing ring during the joining of the pipes. U.S. Pat. No. 5,735,528 to Olsson discloses a seal containing a lubricant. The lubricant migrates to the surface of the seal, thereby providing self-lubricating properties. Each of these methods provide the lubricant only the first time, or a limited number of times, the gasket forms a seal. The lubricant is eventually wiped off or spent. After the lubricant is wiped off or spent, a lubricant may need to be manually applied to ensure a proper seal.

In Applicant's co-pending application Ser. No. 10/419,541, filed in the U.S. Patent and Trademark Office on Apr. 21, 2003, entitled "PERMANENTLY LUBRICATED GASKET" incorporated herein by reference uses a lubricating agent additive that migrates to the surface of the gasket. This approach lowers the coefficient of friction "COF" and allows the pipe to be assembled without lubrication. The migration results in an oily texture on the surface of the gasket that can be undesirable in certain applications.

Another potential shortcoming of using a migrating lubricating agent or additive is creating a condition having a heightened disposition to contamination. A migrating lubricant agent produces an oily texture on the gasket surface that attracts dust and debris, which can lead to leaks and failure in the pipe joint when assembled. There also exists a problem of chemical migration to areas undesirable of lubrication.

There is a need for a gasket combined with a permanent lubricating chemical film resistant to contamination and propitious to welding operations while maintaining lubrication regardless of the frequency that the joint is assembled and disassembled. In addition there exists a need for a gasket to include a lubricating portion that is integrated within the gasket during the extrusion process eliminating a need for labor and cost intensive secondary operations. While yet a need exists for a gasket having a lubricated portion susceptible to compression and expansion without cracking, while retaining lubrication within a controlled location.

SUMMARY OF THE INVENTION

The lubricated film gasket concerns a permanently lubricated annular gasket for providing a fluid-tight seal between an inner pipe and a smooth annular section of an outer pipe or section when the corrugated pipe and the outer pipe or section are in a relative surrounded and surrounding relationship. A first portion of the gasket is shaped to fit within a groove or recess of the corrugated pipe. A second portion of the gasket extends from the first portion. The second portion includes a leading edge partially comprised of a permanently lubricating chemical film. The second portion is configured to make sealing contact with the outer pipe or section when the corrugated pipe and the outer pipe or section is in a relative surrounded and surrounding relationship.

In one embodiment, the first portion, second portion, and permanently lubricating chemical film are combined during the injection molding process. In this embodiment, the first portion has a first durometer and the second portion has a second durometer that is less than the first durometer. In this embodiment, the second portion may include a non-lubricated portion and a permanently lubricated portion that is permanently lubricated by the lubricating chemical film. In this embodiment, the gasket may be tri-extruded such that the permanently lubricated chemical film is embedded within a substantial portion of the leading edge of the second portion and the lubricating film, second portion, and first portion are formed together during a single extrusion operation.

In another embodiment, the permanently lubricated annular gasket includes a single body portion of a particular durometer suitable such that the body portion is capable of residing within a recess of an inner pipe at a first end and creates a sealing engagement with at coacting outer pipe at a second end. The permanently lubricated chemical film is coextruded with the body portion along a substantial portion of a leading edge at the second end during a single extrusion operation.

In an alternative embodiment, the permanently lubricated chemical film is coextruded with the second portion. Subsequent to the forming of the chemical film within the second portion is the coextruding of the second and first portions.

In another embodiment, the second portion and the permanently lubricating chemical film are joined at a die head or through an injection mold process. Such approach eliminates the need for any labor and cost intense secondary operation.

In yet another embodiment the lubricating film is made from materials having a low COF and more specifically a value of 0.5 or less. In one embodiment the COF is preferably 0.3. Examples of suitable low COF materials include polypropylene or polyethylene, which typically provide a 0.3 COF value. The lubricating film is combined to the second portion along a substantial portion of the leading edge and the film comprises a very thin layer ranging from 0.001"-0.010" and preferably having a thickness between 0.003"-0.005".

Another feature is that in most applications the lubricating film forms a protective shell over the gasket minimizing the potential for tearing or cuts in the material. Yet another feature of the lubricating film is the ability to integrate the film to controlled areas along the leading edge of the second portion, thereby allowing a trailing portion of the second portion to lock or grip the pipe when forces are applied opposite the direction of the lubricating film.

Another feature is the controlled placement and static characteristics of the lubricating film, which substantially reduces the potential for failure when performing welding and joining operations to the ends of the gasket.

These and other advantages and features of the exemplary embodiments of the lubricated film gasket and method of manufacture are described in detail in conjunction with the accompanying drawings.

BRIEF DESCRIPTION OF THE DRAWINGS

FIG. 1 is a perspective view of a portion of the annular gasket of one embodiment of the present invention;

FIG. 2 is a cross section of the elastomeric gasket of one embodiment of the present invention;

FIG. 3 is a sectional view of a gasket of the present invention installed on a corrugated pipe;

FIG. 4 is a sectional view of a gasket of the present invention installed on a corrugated pipe, and engaged by an enlarged end of a second pipe;

DETAILED DESCRIPTION OF THE PREFERRED EMBODIMENTS

Figure 5:
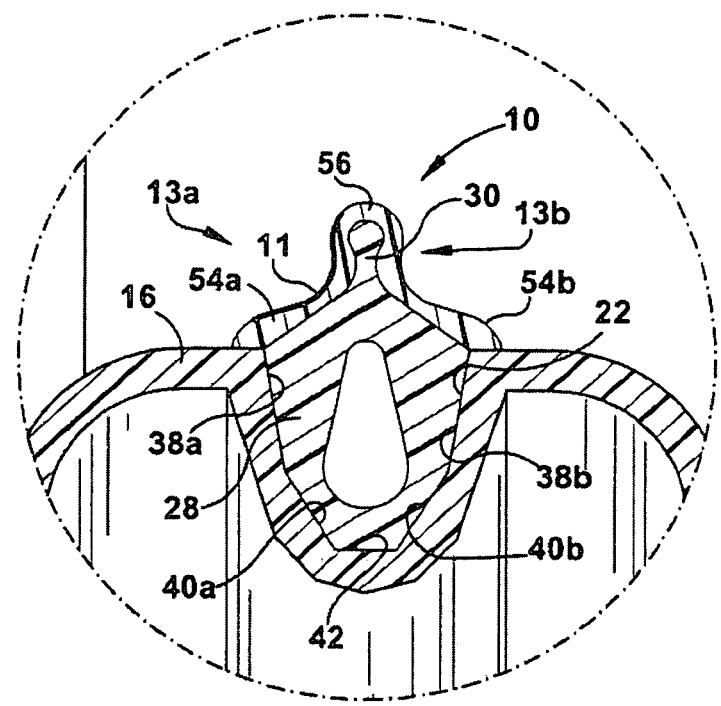
FIG. 5 is an enlarged fragmented view of FIG. 3.

The present invention is directed to a permanently lubricated film annular gasket 10, depicted in FIGS. 1 and 2, for providing a fluid tight seal between a first tubular member 12 and second tubular member 18, as shown in FIGS. 3 and 4. In the illustrated embodiment, the first tubular member has a plurality of annular grooves 14 and ridges 16 and the second tubular member includes a smooth annular section 20, such as a bell.

Referring again to FIGS. 1 and 2, the annular gasket 10 includes a first, support portion 24 and a second, elastomeric gasket portion 26. The support portion 24 is made from a material having a first, relatively hard, durometer. The elastomeric gasket portion 26 is made from a relatively soft, durometer material, and includes a leading edge 13a and oppositely positioned trailing edge 13b. Formed along a substantial portion of the leading edge 13a of gasket portion 26 is a permanently lubricated film 11. The permanently lubricated film could be made from any material having a low coefficient of friction "COF", and more specifically level of 0.5 or less. In one embodiment the COF is preferably valued at approximately 0.3, which would include materials such as polyethylene or polypropylene. The permanently lubricated film is relatively thin, having a thickness range between 0.001" to 0.010" preferably ranging between 0.003" to 0.005" thick, and is typically applied along a substantial portion of the leading edge 13a.

The lubricating film 11 reduces the COF between tubular members 12 and 18 during the interconnecting of the members. Because the lubrication is produced from a film, the target areas for lubrication can be controlled and isolated. This provides several advantages such as a reduced risk of failure at welded connections because the joining portions of the gaskets are virtually lubricant free, unlike self-lubricating gaskets where the lubrication tends to migrate into undesirable areas. Another advantage of film lubrication is that after the pipe is assembled, the non-lubricated trailing edge 13b acts as a lock, gripping the pipe, thereby resisting separation between the tubular members. Yet another advantage of the film lubrication is the ability to simultaneously extrude the lubricating film with any number of desired extrudates, thus eliminating costly secondary operations for applying lubrication to a gasket.

Figure 6:
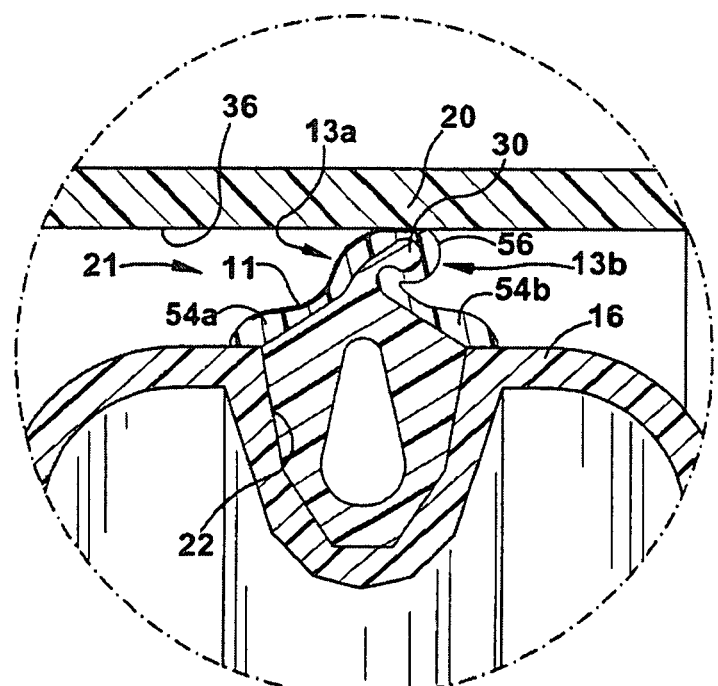
FIG. 6 is an enlarged fragmented view of FIG. 4.

The figures illustrate one example of a physical configuration of a permanently lubricated gasket. However, the inventive permanently lubricated film gasket 10 could take any physical form without departing from the spirit and scope of the claimed invention. Referring to FIGS. 4 and 6, the illustrated permanently lubricated film gasket 10 seals a gap 21 between the first tubular member 12 and the smooth annular section 20 of the second member 18 when the first tubular member and the smooth section are in a relative surrounded and surrounding relationship. In the illustrated embodiment, the second tubular member 18 is a corrugated pipe having an integral bell or large end that is not corrugated. In an alternate embodiment, the integral bell or large end includes corrugations that strengthen the integral bell or large end. In the illustrated embodiment, the first tubular member 12 is a corrugated pipe that includes a recess 22 in one of the ridges 16. It should be readily apparent that the inventive permanently lubricated film gasket 10 could be used on any type of pipe. For example, the permanently lubricated gasket could be used with PVC pipe, corrugated metal pipe, corrugated plastic pipe, fiberglass pipe, or cast iron pipe. Further, it should be readily apparent that the outer pipe could include corrugation(s) while the end of the inner pipe is smooth. For example, the permanently lubricated gasket could be used to form a PVC bell and spigot joint.

In the illustrated embodiment, the support portion 24 includes an anchor portion 28 shaped to fit within the recess 22 in a ridge 16 of the corrugated pipe and a tip portion 30 that extends radially outward from the anchor portion 28. In an alternate embodiment, (not illustrated) the anchor portion 28 is shaped to fit within a groove 14 in the corrugated pipe. Referring to FIG. 5, the tip portion 30 is radially outward of the ridge 16 when the anchor portion 28 is disposed in the recess 22 in the ridge 16 or a groove 14 in the corrugated pipe.

The anchor portion 28 is shaped to fit within the recess 22 in a ridge 16 in the corrugated pipe. The shape of the anchor portion 28 can be changed to fit within recesses having different shapes or to fit within a groove 14 in the corrugated pipe. Referring to FIGS. 1 and 2, the illustrated support portion 28 includes first and second side surfaces 32a, 32b, first and second intermediate surfaces 34a, 34b, and an inner surface 36. Referring to FIG. 5, the first and second side surfaces 32a, 32b correspond to first and second sidewalls 38a, 38b of the recess 22. The intermediate surfaces 34a, 34b correspond to intermediate walls 40a, 40b. The inner surfaces 36 correspond to a bottom wall 42 of the recess 22. The anchor portion 28 includes an outer surface 50 formed by first and second radially outer lateral surfaces 52a, 52b.

Referring to FIGS. 1 and 2, the anchor portion 28 includes an opening 44. The opening 44 reduces the amount of material needed to form the anchor portion 28. In the illustrated embodiment, the opening 44 has a tear drop shape. It should be readily apparent to those skilled in the art that any shape of opening could be used.

Referring to FIGS. 1 and 2, the illustrated tip portion 30 includes a transition portion 46 or neck portion and an end portion 48 that is rounded in the illustrated embodiment. The transition portion 46 is an area of reduced thickness that extends from the outer surface 50 of the anchor portion 28 in the illustrated embodiment. It should be readily apparent to those skilled in the art that the thickness of the transition portion 46 can be varied to increase or decrease an amount of force required to deflect the end portion 48. The end portion 48 extends radially outward from the neck portion 46. It should also be readily apparent to those skilled in the art that the end portion can be any shape that holds a gasket portion in contact with the second tubular member.

In the exemplary embodiment, a harder material typically having a range of 60-70 durometer is used to construct the support portion 24. Some examples of a suitable material would include 70-durometer santoprene, styrene ethylbutylene styrene ("SEBS"), and thermoplastic vulcanizate ("TPV"). Use of a harder material for constructing the support portion 24 increases the force required to fold the tip portion 30 over. The result is that a tighter seal is provided against the smooth annular section 20 and the ridge 16. The material used in the support portion 24 also reinforces the pipe corrugation, reducing the amount deflection when pressure is applied. It should be readily apparent that other filler material could be used to construct the support portion 24 of the gasket 10. The elastomeric gasket portion 26 is made from a second material having a durometer that is less than the durometer of the support portion 24. In the exemplary embodiment the second elastomeric gasket portion 26 is preferably made from a material having a 40 to 50 durometer range. Some examples of suitable material include 40-50 durometer santoprene, isoprene, and ethylene propylene diene monumer (EPDM). It should also be readily apparent that the support portion 24 could be made from the same material that the gasket portion 26 to eliminate the coextrusion process between the support and gasket portions.

Referring to FIGS. 1 and 2, the gasket portion 26 is disposed on the tip portion 30 and the outer surface 50 of the support portion 24. The gasket portion 26 is configured to make sealing contact with a ridge 16 and the smooth annular section 20 when a corrugated pipe having a recess 22 in which the gasket 10 is received and the smooth annular section 20 of the second tubular member 18 are in a relative surrounding relationship (see FIGS. 4 and 6).

The illustrated elastomeric gasket portion 26 includes first and second leg portions 54a, 54b connected by a central portion 56. The central portion 56 covers the tip portion 30 of the support portion 24. The central portion 56 can be configured in any shape that makes contact with the smooth annular section 20.

In the exemplary embodiment the permanently lubricating film 11 extends from the radially outer surface 52a to the central portion 56 of the leading edge 13a of the gasket portion 26. It should be apparent that it may be desirable to cover more or less of the surface area of the leading edge 13a depending on the tubular member configuration and particular application. The first and second leg portions 54a, 54b cover the radially outer surfaces 52a, 52b of the anchor portion 28 and extend laterally of the first and second side surfaces 32a, 32b of the anchor portion 28. In the exemplary embodiment, the permanently lubricating film 11, gasket portion 26, and the support portion 24 are triextruded. In another embodiment, the support portion and the gasket portion are bonded together by some means other than co-extrusion. The gasket may be attached to the support portion by adhesives or any other acceptable attachment method.

The gasket 10 can be made by extruding a length of gasket material and connecting its ends together by gluing, vulcanization, injection molding, or a welding process. For example, an annular gasket 10 for an 18 inch pipe would be formed of a 57.5 inch of gasket material. An annular gasket 10 for a 24 inch pipe would be formed from a 76.0 inch length of gasket material. The annular gasket 10 can also be molded to eliminate the step of connecting the gasket ends, while remaining conducive to embedding the permanently lubricating film 11 along the leading edge 13a of the gasket portion 26.

FIGS. 3, and 4 illustrate a coupling 58 formed with the disclosed gasket 10. Although the gasket 10 could be used to form a joint between metal, concrete and other tubular sections, it is particularly well suited for use with corrugated plastic pipe. The illustrated coupling 58 includes a corrugated pipe 12, an outer annular section 20 (a bell portion of a second corrugated pipe in the illustrated embodiment) and an annular gasket 10. The corrugated pipe 12 has annular grooves 14 in ridges 16. In the illustrated embodiment, one of the ridges 16 includes a recess 22 that receives an anchor portion 28 of the gasket 10. In an alternate embodiment, the anchor portion 28 is sized to fit within one of the grooves 14 in the corrugated pipe. The annular section 20 is disposed around the corrugated pipe 12. The annular gasket 10 is disposed between the corrugated pipe 12 and the annular section 20. The anchor portion 28 of the annular gasket 10 is disposed within the recess 22. The tip portion 30 of the support portion 24 extends radially outward of the ridge 16. Referring to FIG. 6, the first and second leg portions 54a, 54b are disposed on a ridge 16 and make sealing contact with a ridge 16. The leading edge 13a up through the central portion 56 of the gasket portion 26 form a sealing contact with the smooth annular section 20. The lubricating film 11 facilitates in the sealing contact as the film lubricates the gasket portion 26 during the engagement process by making contact with inner surface 36 as best seen in FIG. 6.

Referring again to FIG. 6, the smooth annular section 20 or enlarged bell portion applies pressure to the central portion 56 of the gasket portion 10 and deforms the central portion 56. The tip portion 30 is harder than the gasket material, increasing the force required to fold over or bend the central portion 56 of the gasket 10. The increase in force required to deform the central portion 56 results in a tighter seal between the central portion 56 and the bell of the second tubular member and a tighter seal between the leg portions 54a, 54b and the ridge 16.

In addition, since the material of the anchor portion 28 is harder than the gasket portion 26 material, the anchor portion 28 material reinforces the pipe corrugation, reducing the amount of deflection of the pipe corrugation when pressure is applied. Referring to FIGS. 3, 4, 5 and 6, the disclosed gasket 10 is used in a method of providing a fluid tight seal between a corrugated pipe having a ridge 16 that includes a recess 22 and a smooth inner surface 36 of an annular section 20 or bell portion. The support portion 24 of the gasket 10 is inserted into the recess 22 of a corrugated pipe. The tip portion 30 of the support portion 24 extends radially outward of the ridge 16. The ridge 16 is engaged with the leg portions 54a, 54b that are disposed on the radially outer surfaces 52a, 52b of the support portion 24. The corrugated pipe is inserted into a smooth annular section 20, such as the depicted bell portion of a corrugated pipe having a smooth inner surface 60. The smooth annular section 20, or bell portion, engages the permanently lubricated film 11 that extends along the leading edge 13a of the elastomeric gasket portion 26. The central portion 56 of the elastomeric gasket portion 26 and the tip portion 30 of the support portion 24 are deformed by the smooth annular section 20, or bell. The harder tip portion 30 resists deformation and presses the central portion 56 and gasket portion 26 tightly against the bell, thereby creating a tight seal between the central portion 56 in the bell. The increase in force required to deform the tip portion 30 presses leg portions tightly against the ridge 16.

Referring to FIG. 5, is an embodiment where the first support portion 24 is made from a material that is relatively hard durometer. For example, the support portion may be made from a material having a 70-durometer hardness. In this embodiment, the second gasket portion 26 is made from the elastomeric material containing the lubricating chemical film 11 along a substantial portion of the leading edge 13a of gasket 26 making it permanently lubricated. However, the position of the permanently lubricated chemical film 11 could be at any location on the gasket requiring lubrication without departing from the spirit and scope of the claimed invention.

Figure 7:
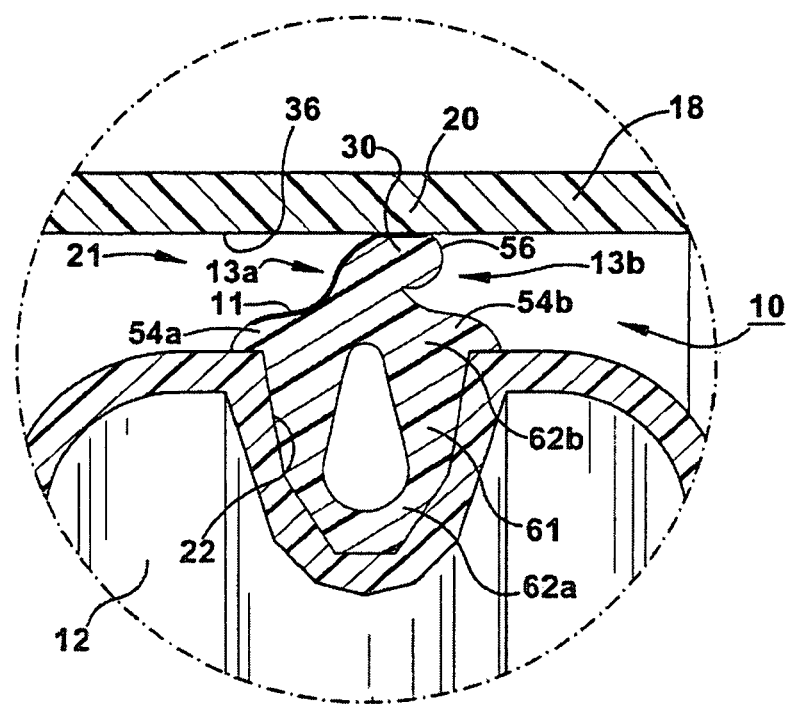
FIG. 7 is a side view of the elastomeric gasket of another embodiment of the present invention.

Referring to the embodiment of FIG. 7, the permanently lubricated film gasket 10 includes a single body portion 61 of a particular durometer suitable such that the body portion 61 is capable of residing within a recess 22 of a first tubular member 12 at a first end 62a and create a sealing engagement with at coacting second tubular member 18 at a second end 62b. The single body portion durometer can range at a level acceptable to pipe standard specifications for elastomeric seals, ASTM F477 would include an example of such a standard. In the exemplary embodiment, the preferred durometer of the single body portion would range between 40 and 60 durometer on a Shore A scale. The permanently lubricated chemical film 11 is coextruded with the body portion 61 along a substantial portion of a leading edge 13a at the second end 62b during a single extrusion operation. The permanently lubricated chemical film 11 is formed only in portions of the second end 62b requiring lubrication. The lubricating film 11 can be made from lubricating materials having a reduced COF and in the exemplary embodiment is preferably a level of 0.5 or less. Such materials include polypropylene or polyethylene. The lubricating film is combined to the gasket 10 from a very thin film layer ranging from 0.001"-0.010" and preferably 0.003"-0.005" thick. The geometrical features of the single body portion act in the same manner as the two-part extrusion gasket 26 and support 24 portions already described in detail above. The single body portion 61 eliminates the triextrusion process of the two-part extrusion and requires only a coextrusion operation with the lubricating film 11 and single body portion 61.

Figure 8:
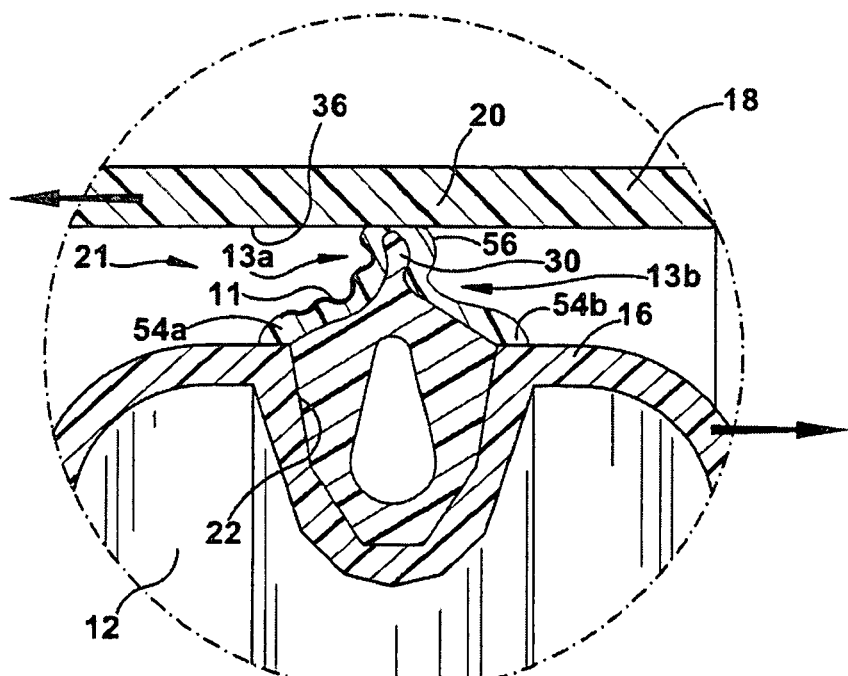
FIG. 8 is an enlarge view of the elastomeric gasket and coacting tubular members reacting to separation forces.

FIG. 8 includes a triextruded permanently lubricated film gasket exposed to separation forces between the tubular members, as indicated by arrows depicting the relative forces imposed on the first tubular member 12 and second tubular member 18. Because the lubricating film is only located on the leading edge 13a of the gasket portion, when the forces deflect the central portion 56 and tip 30 in a direction away from the lubricated portion 11, the non-lubricated portion, particularly the trailing edge 13b acts as a brake. Thus, the absence of lubrication along the trailing edge 13b helps lock the tubular members together, thereby assisting in maintaining a sealing engagement.

The method of manufacture in the exemplary embodiment includes, at least one polymeric material being loaded into a first extruder and a permanently lubricated film material being loaded into a second extruder having a common extrusion die head assembly with the first extruder. In one embodiment the lubricated film 11 could be in a granular form prior to the extrusion process. The materials are located within the respective extruders and heated to a temperature range of 350 to 425 degree Fahrenheit, resulting in a molten state for both the polymeric and lubricating film gasket materials. Once the prescribed temperature is reached, which in the exemplary embodiment is preferably slightly above or at 350 degrees, the polymeric and film gasket materials are fed through the common die head assembly, forming a single extrusion gasket 10 with a lubricated film 11 embedded along a select portion of the gasket. After which, the extrusion is typically fed through a water bath for cooling to a prescribed temperature level before being cut and welded.

In another embodiment, the permanently lubricated film 11 is preformed prior to the extrusion process. As such, the film 11 remains in a solid state during the heating and extruding processes while being formed with the polymeric material or materials. In another embodiment, the low COF film 11 is applied to by spraying the film on the molten polymeric material just after the extrudate passes through the die head in the coextrusion or triextrusion process. The film being sprayed can include ultraviolet cured films. Such an example of an ultraviolet film would include, for example, polyether acrylate with 50% nano-scale silica currently being sold by BASF Coatings AG under the tradename LAROMER® PO 9026 V. Other types of suitable spray films can be films capable of being chemically or thermally cured. In yet another embodiment, the polymeric materials have differing compositions and durometer values as discussed earlier.

It will be understood that various modifications can be made without departing from the spirit and scope of the invention.

The invention claimed is:

1. A method of manufacturing a permanently lubricated film gasket for providing a fluid-tight seal between a pair of tubular members comprising the steps of:
   (a) providing a first lubricated material comprising a permanently lubricated film having a low coefficient of friction;
   (b) providing a second material comprising a thermoplastic;
   (c) loading a respective extruder with said first and second materials;
   (d) heating said first and second materials within a heating section of the respective extruders;
   (e) feeding said first and second materials from said heating sections into a die head; and
   (f) forming a single extrusion from said first and second materials, the extrusion having said permanently lubricated film having a prescribed solid thickness confined along a select portion of a leading profile of said permanently lubricated film gasket.

2. The method of claim 1, wherein said permanently lubricated film is preformed.

3. The method of claim 1, providing said second material having a first and second portion, wherein said first portion having a first durometer material and a second portion having a second durometer material relatively lower than said first durometer material.

4. The method of claim 1, wherein said permanently lubricated film is polypropylene.

5. The method of claim 1, wherein said permanently lubricated film is polyethylene.

6. The method of claim 3, wherein said first durometer material, second durometer material, and said permanently lubricated film are triextruded.

7. The method of claim 1, wherein said select portion includes a contacting portion of said second material that coacts with a surface of one of a pair of tubular members to form a sealing connection between members.

8. A method of forming a gasket having a permanently lubricated material comprising the steps of:
   providing support material having a first durometer and sealing material having a second durometer different than said first durometer;
   providing permanently lubricated material having a relatively low coefficient of friction relative to said sealing and support materials;
   loading said support material, sealing material, and permanently lubricated material into a respective extruder for forming a permanently lubricated gasket;
   heating said support material, sealing material, and permanently lubricated material within a heating section of said respective extruders;
   feeding said support material, sealing material, and lubricated material from said heating sections into a die head; and
   forming from said die head a leading profile and trailing profile to be formed with said sealing material and lubricated material and said lubricated material is further formed into a solid lubricated material having a prescribed thickness confined along a select portion of said leading profile in the permanently lubricated gasket.

9. The method of claim 8 further comprising providing differing degrees of mobility facilitating the movement of contacting pipe members along the leading profile formed with said lubricated material and inhibiting the movement of contacting pipe members along the trailing profile formed with said sealing material.

10. The method of claim 8 wherein said lubricated, sealing, and support materials are simultaneously triextruded through said die head.

11. The method of claim 8 wherein the step of providing a solid lubricated material having a prescribed thickness further comprises providing a solid lubricated material having a prescribed thickness ranging between 0.003" and 0.005".

12. The method of claim 8 wherein the step of providing a solid lubricated material of a prescribed thickness further comprises providing a solid lubricated material of a prescribed thickness having a static coefficient of friction less than 0.5.

13. A method of forming a gasket having a permanently lubricated film comprising the steps of:
   providing support material having a first durometer and sealing material having a second durometer different than said first durometer and providing lubricated material comprising a permanently lubricated film having a relatively low coefficient of friction relative to said sealing and support materials;
   loading said support material, sealing material, and lubricated material in a respective extruder for forming a permanently lubricated gasket;
   heating said support material, sealing material, and lubricated material within a heating section of the respective extruders;
   providing a die head for forming the profile of said permanently lubricated gasket, said die head forming as leading section and trailing section located about a tip extending from a central portion of said gasket, said tip forming leading side and trailing side corresponding with said leading and trailing sections;
   feeding said support material, sealing material, and lubricated material from said heating sections into said die head of said respective extruders; and
   confining said lubricated material along a select portion of said leading section of the permanently lubricated gasket such that during use when forces deflect said tip and central portion on the leading side, friction is low and when forces deflect said tip and central portion on the trailing side, friction is high, resulting in differing degrees of mobility to contacting pipe members between the leading side and trailing side of the permanently lubricated gasket during use.

14. The method of claim 13 wherein the differing degrees of mobility comprises facilitating the movement of contacting pipe members along the leading side formed with said lubricated material and inhibiting the movement of contacting pipe members along the trailing side formed with said sealing material.

15. The method of claim 13 wherein the step of confining said lubricated material comprises the step of extruding said lubricated material into a surface of the leading side of said permanently lubricated gasket.

16. A method of manufacturing a permanently lubricated film gasket for providing a fluid-tight seal between a pair of tubular members comprising the steps of:
 (a) providing a first material comprising a permanently lubricated film having a low coefficient of friction;
 (b) providing a second material comprising a thermoplastic;
 (c) loading a respective extruder with said first and second materials;
 (d) feeding said first and second materials from said respective extruders into a die head to form a single extrusion from said first material and second material; and
 (e) isolating said permanently lubricated film as a permanently lubricated solid film having a prescribed thickness along a select portion of a leading profile of said extrusion and away from a trailing profile in said extrusion, the leading and trailing profiles being separated by a central portion defining a tip.

17. The method of claim 16 wherein said gasket provides differing degrees of mobility, such that daring use said gasket facilitates the movement of tubular members in contact with the said select portion the leading profile formed with said lubricated material and said gasket inhibits the movement of tubular members in contact with a trailing profile in said extrusion.

* * * * *